United States Patent [19]
Robinson

[11] Patent Number: 4,536,867
[45] Date of Patent: Aug. 20, 1985

[54] SELF-CENTERING DISC

[75] Inventor: Joseph B. Robinson, Scotts Valley, Calif.

[73] Assignee: Qume Corporation, San Jose, Calif.

[21] Appl. No.: 600,724

[22] Filed: Apr. 16, 1984

[51] Int. Cl.³ .......................... G11B 3/70; G11B 7/24
[52] U.S. Cl. ................................................. 369/282
[58] Field of Search ............... 369/280, 282, 290, 291; 360/133

[56] References Cited

U.S. PATENT DOCUMENTS 1,732,747 10/1929 Germain .............................. 369/282
1,821,916 9/1931 Acheson et al. .................... 369/282
4,204,686 5/1980 Church ................................ 369/291

FOREIGN PATENT DOCUMENTS 324282 1/1930 United Kingdom ................ 369/282

Primary Examiner—Steven L. Stephan
Attorney, Agent, or Firm—T. L. Peterson; J. M. May

[57] ABSTRACT

A disc is provided which centers itself on motor shafts that vary somewhat in diameter. The disc is formed of a single sheet of material with a central hole for receiving the shaft and with a group of fingers projecting slightly into the hole to engage a shaft. The fingers are formed by pairs of slots that extend from the edge of the central hole and radially outward to form fingers of considerable length which can be bent out of the plane of the disc to engage shafts of varying size. The radially inner tips of the fingers lie precisely on an imaginary circle which is slightly smaller than the minimum diameter of a shaft, and the fingers deflect uniformly to hold the shaft centered on the axis of the disc.

5 Claims, 4 Drawing Figures

SELF-CENTERING DISC

BACKGROUND OF THE INVENTION

This invention relates to optical indexing discs, and more particularly, to a self-centering disc. Optical encoding discs which have rings of slits around their periphery may be mounted on a hub and the hub, in turn, mounted on a shaft. It is important that the axis of the disc be positioned precisely concentric with the axis of the shaft. Since the diameter of different shafts may vary, the discs have often been constructed with central holes slightly larger than the largest expected shaft, and the radial positions of the discs have been adjusted by hand to position them precisely on center with the shafts. Such positioning of the discs has been time consuming. A simple and low cost disc which precisely centers itself would be of considerable value.

SUMMARY OF THE INVENTION

In accordance with the present invention, a relatively simple and easily constructed disc is provided which centers itself on shafts with a wide range of tolerance between the outer diameter of the shafts and their normal diameter. The disc is formed of a single sheet of material having a central hole for receiving the shaft. Much of the hole wall is larger than the largest expected shaft size, while other positions form easily-deflected fingers whose radially inner tips lie precisely on a circle having a diameter smaller than the smallest shaft to be engaged by the disc. Each finger is formed by a pair of slots which extend from the edge of the central hole and radially outwardly a limited distance to form a finger of considerable length that can be easily bent. When the disc is pressed onto a shaft, all of the fingers deform by about the same amount so the axis of the shaft lies very close to the axis of the disc.

The novel features of the invention are set forth with particularity in the appended claims. The invention will be best understood from the following description when read in conjunction with the accompanying drawings.

DESCRIPTION OF THE PREFERRED EMBODIMENT

Figure 1:
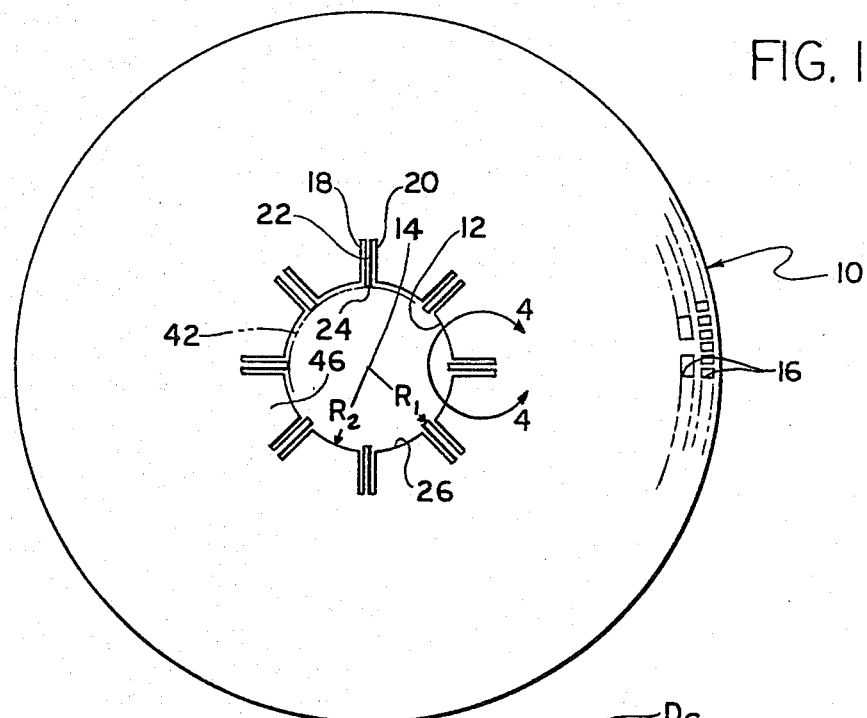
FIG. 1 is a plan view of a disc constructed in accordance with the present invention.

FIG. 1 illustrates an encoding disc 10 which has a central hole 12 for receiving the shaft, such as a shaft of a motor, to turn the disc about its axis 14. The disc carries circles of encoding apertures 16 which are accurately concentric with the axis 14. It is important that the disc be mounted on the shaft so the disc axis 14 is accurately centered on the shaft.

The disc is formed of a single thin sheet of metal with pairs of slots 18, 20 therein which form fingers 22. The radially inner ends 24 of the fingers each lie a distance R1 from the disc axis 14, which is less than the radius R2 of the major portion 26 of the walls of the central hole. The radiuses R1 and R2 are selected so that when a shaft is inserted through the central hole 12, it engages only the tips of the fingers 24, but normally not the surrounding major portion 26 of the central hole which occupies most of the space between adjacent fingers.

Figure 2:
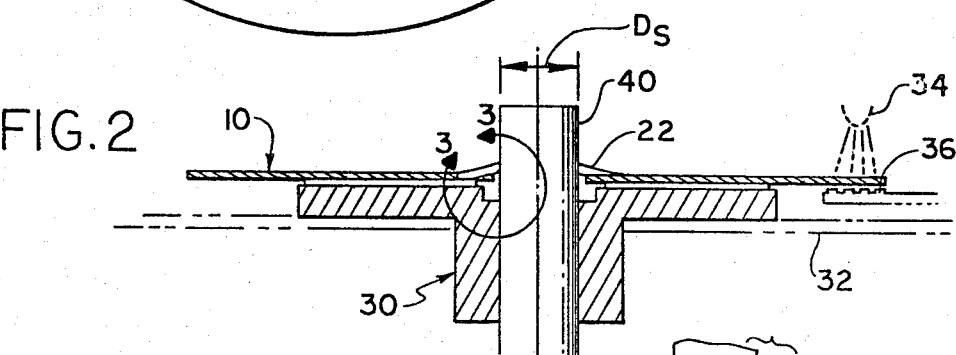
FIG. 2 is a sectional side view of the disc of FIG. 1, shown mounted on a hub and on a shaft.

FIG. 2 shows the disc 10 adhesively mounted on a hub 30 which may hold a rotary wheel printing element indicated at 32 or other rotating element. The disc 10 can be used by shining light from a source 34 through the encoding apertures in the disc to photodetectors 36, the output of which indicates the position of the encoding disc and therefore of a rotary printing element 32 or other rotating device. The disc is shown with a shaft 40 of a diameter Ds received in the central hole of the disc with the shaft engaging and deflecting upwardly the fingers 22 of the disc.

Figure 3:
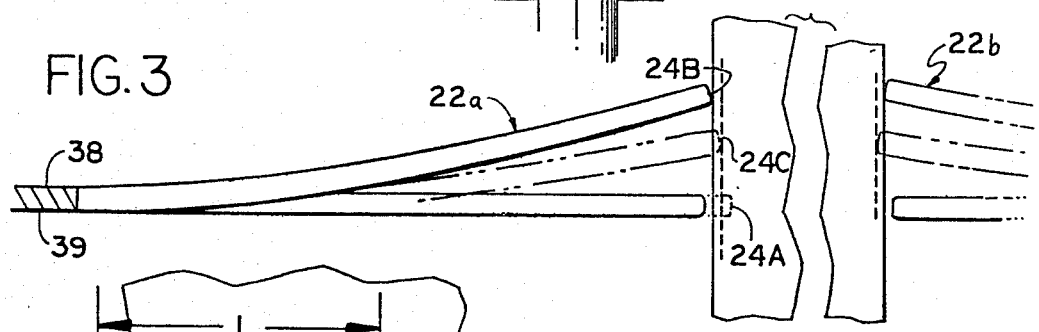
FIG. 3 is an enlarged view of the area 3—3 of FIG. 2.

FIG. 3 is a greatly enlarged view showing a pair of opposite fingers 22a, 22b engaged with opposite sides of the shaft 40. The disc has parallel opposite faces 38, 39, except at the fingers 22 when they engage a shaft and their faces are bent out of the planes of the rest of the disc. Each finger is deflected from its quiescent position wherein its tip is at the position 24A, to a deflected position 24B. Since both of the opposite fingers 22a, 22b are substantially identical, both will be deflected substantially the same amount so the disc will position itself concentric with the axis of the shaft. If a shaft of smaller diameter is received, the fingers will deflect less with their tips at the positions 24C, but they will both deflect the same amount and the disc will still position itself concentric with the axis of the shaft. Thus, while the multiple-finger arrangement permits the disc to engage shafts of different diameters within a wide range of tolerances, it also assures that the disc will be held precisely concentric with the axis of the shaft.

The disc is constructed so that the tips 24 of the fingers lie precisely on an imaginary circle 42 (FIG. 1) of radius R1, with the circle 42 precisely concentric with the axis 14 of the disc, usually with a tolerance of no more than about 0.001 inch for precision, and preferably with a tolerance of about 0.0002 inch. The finger tips 24 are substantially flat, or curved to a radius greater than their width W. Also, the fingers 22 are constructed so they are uniformly spaced around the disc axis and are each substantially identical. This can be easily accomplished where the disc 10 is a simple flat sheet of material. Electro-forming techniques are well known for defining small and precisely positioned configurations such as the encoding slits 16 and finger ends 24 in such a thin sheet of material to the required accuracy.

Applicant has constructed discs for engaging shafts of nominal diameters of 0.25 inch. The major radius R2 of the central hole was formed to a diameter between 0.2500 and 0.2504 inch, to provide clearance for shafts of up to 0.2500 inch diameter. The fingers 22 had tips 24 lying on an imaginary circle 42 of a diameter which was held to be between 0.2450 inch and 0.2445 inch. Thus, the distance from a tip 24 of an individual finger and the disc's center was controlled within 0.00025 inch. The fingers therefore could theoretically engage motor shafts of diameters ranging between 0.2450 and 0.2500 inch with the disc shaft maintained concentric with the motor shaft within 0.00025 inch.

Figure 4:
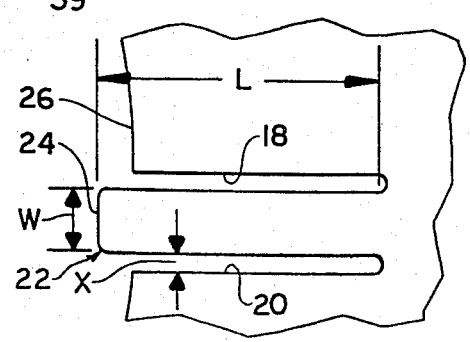
FIG. 4 is an enlarged view of the area 4—4 of FIG. 1.

Discs were constructed with various outside diameters, with one disc having an outside diameter of one and one-quarter inch. The discs had a thickness of about 0.002 inch. As shown in FIG. 4, each of the fingers had a width W of 0.01 inch, each slot had a width X of 0.005 inch, and each finger had a length L of 0.070 inch, with the slots 18, 20 being parallel.

The thin finger 22 can be thought of as leaving wide secondary fingers 46 between them. The width of the secondary fingers 46 is more than twice the width of the first fingers 22 at their radially inner ends, so that the major portion of the central hole 12 has walls that are stiff, and only the fingers 22 undergo substantial deflection. These wide secondary fingers 46 are dimensioned so as not to deflect when the disc is being assembled onto the shaft 40 but rather provide a coarse centering therebetween; in addition, secondary fingers 46 do protect the relatively narrow centering fingers from excessive stress and deflection beyond their elastic limit during the electro-forming process, intermediate handling and installation on the shaft. It is possible to form the first fingers 22 of a variety of shapes rather than as fingers of uniform width, although uniform width fingers have been found to operate satisfactorily.

Thus, the invention provides a self-centering disc which can be constructed at low cost, and yet which centers itself with great precision on shafts of a range of diameters. This is accomplished by the use of a single sheet disc having a plurality of slots extending into the walls that surround its central hole to form a plurality of fingers. The fingers can be considered to include first narrow fingers 22 and second groups of fingers 46 interspersed with the narrow ones. Only three of the narrow fingers 22 are theoretically required to center the disc on a perfectly round shaft; however, because of limitations on the centerless grinding operation typically used to form the shaft's outer surface, it is possible for some shafts to exhibit regular variations in radius about the shaft's circumference (e.g. 3 or 5 spaced lobes) and thus a greater number of centering fingers 22 is statistically more likely to center the disc 10 to the required accuracy, even if the shaft 40 is not perfectly round. The radially inner ends 24 of the narrow first fingers lie on an imaginary circle of smaller diameter than the circle on which the wide fingers 46 lie. The inner tips of the narrow fingers can be formed to lie at a given distance from the axis of the disc, with extreme precision, using well known techniques that are relatively inexpensive.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A self-centering shaft-engaging disc, comprising:
a disc formed of a single sheet of material defining a hole centered on the axis thereof, said disc having a plurality of slots extending into the walls surrounding said hole to form a plurality of fingers, including first and second groups of fingers with the fingers of said groups interspersed, at least three of said first fingers having radially inner ends lying on a first circle concentric with said disc axis, and said second fingers having radially inner ends lying on a second circle of greater diameter and concentric with said disc axis than the radius of said first circle, whereby when a shaft having a radius greater than the radius of said first circle is inserted through said central hole, the first group of fingers engage the shaft and center it on the axis of the disc.

2. The disc described in claim 1 wherein:
the width of each of the first group of fingers is less than ½ the width of each of the second group of fingers at their radially inner ends, and each of said finger of said group has substantially parallel opposite sides, whereby to provide flexible first fingers and rigid second fingers.

3. The disc described in claim 1 wherein:
all of said disc has opposite faces that each lie in a single plane when the disc is not mounted on a shaft;
the axis of said disc is equally spaced from the radially inner ends of said first group of fingers; and including
a shaft having a radius which is greater than the distance of said axis from the inner ends of said first group of fingers but less than the distance of said axis from the inner ends of said second group of fingers;
said disc lying on said shaft, with the first group of fingers bent out of the plane of the rest of said disc.

4. A disc for engaging a rotatable shaft of approximately a predetermined radius and diameter, comprising:
a sheet disc, said disc having an axis of rotation and having a radially outer portion forming a series of encodings for indicating the angular position of the disc, said disc having a radially inner portion for engaging said shaft;
the inner portion of said disc including a hole, with the major portion of the wall of the hole having a radius, as measured from said axis, which is larger than the shaft to receive the shaft with clearance between them, and including a plurality of pairs of slots each pair extending generally radially outward from the edge of the hole walls to form a finger between them, the radially inner ends of the plurality of fingers lying precisely on an imaginary circle of smaller diameter than the diameter of the shaft to provide an interference fit with the shaft.

5. The disc described in claim 4 wherein:
the spacing between the two slots of a pair of slots at the radially inner ends of the slots, is less than half the spacing between two different adjacent pairs of slots, whereby to form the major portion of the hole more rigid than the fingers.

* * * * *